United States Patent Office 3,840,448

Patented Oct. 8, 1974

3,840,448

SURFACE CURING OF ACRYLYL OR METHACRYLYL COMPOUNDS USING RADIATION OF 2,537 ANGSTROMS

Claiborn Lee Osborn, Charleston, W. Va., and Harden Henry Troue, Indianapolis, Ind., assignors to Union Carbide Corporation, New York, N.Y.

Filed June 26, 1972, Ser. No. 266,122

Int. Cl. C08d *1/00;* C08f *1/00*

U.S. Cl. 204—159.14 16 Claims

ABSTRACT OF THE DISCLOSURE

Ultraviolet radiation substantially at wave-lengths of 2,537 Angstrom units and 1,850 Angstrom units emanating from low pressure, short wave ultraviolet mercury tubes having an electrical input power up to about 5 watts per inch of length with at least about 75 percent of the radiated power having a wave length of 2,537 Angstrom units is used to polymerize or cure or crosslink, preferentially, the surface layer of photocurable monomer or polymer coatings when said coatings are exposed to said radiation under an inert gas atmosphere. The method finds particular application in the field of photocurable protective coatings or inks containing a component having a polymerizable ethylenically unsaturated group.

BACKGROUND OF THE INVENTION

Figure 1:
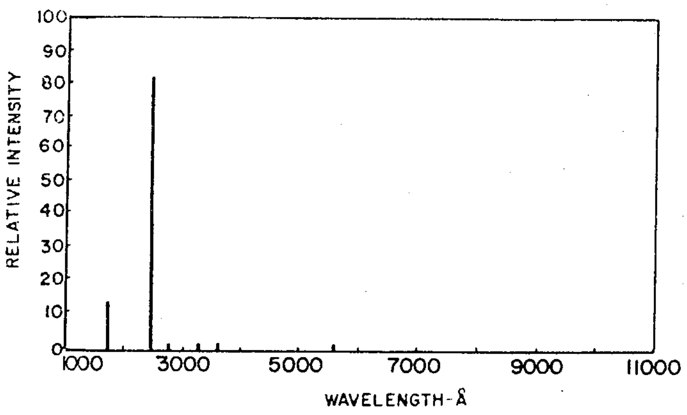

Radiation as a means of polymerizing monomers or curing or crosslinking polymer compositions has been practiced for many years with many different radiation sources and types of radiation energy used. Depending on the particular circumstances and material concerned, ionizing or non-ionizing radiation has been employed. Ionizing radiation can be particulate or non-particulate consisting of alpha, beta, gamma and x-radiation. Suitable sources for generating particulate ionizing radiation include Van de Graaff accelerators, linear accelerators, resonance transformers, insulating core transformers, radioactive elements such as cobalt 60 or strontium 90, or a nuclear reactor unit; all of which are characterized by the emission of electrons or charged nuclei in the radiation stream. Sources of gamma rays are nuclear transitions and x-rays are from electron transitions. Non-ionizing radiation is electromagnetic energy having a wavelength of about 1,000 Angstrom units or longer and includes vacuum ultraviolet radiation (1,000 to 1,600 Angstrom units), short wave ultraviolet (1,600 to 3,000 Angtrom units), near ultraviolet (3,000 to 4,000 Angstrom units), visible light radiation (4,000 to 7,000 Angstrom units) and infrared radiation (above 7,000 Angstrom units). Suitable sources for generating some or all of the above non-ionizing radiation include mercury arcs, carbon arcs, tungsten filament lamps, sodium vapor lamps, xenon lamps, sun-lamps, lasers, and most recently the swirl-flow plasma arc.

The use of non-ionizing radiation in the field of radiation curing of coatings and inks has been increasing in importance because of the ready availability of the equipment, the favorable economics and the absence of hazards associated with eelctromagnetic radiation. The efforts of those skilled in the art have been directed toward the use of ultraviolet radiation, both shortwave and near ultraviolet; however, a significant obstacle has been the difficulty in obtaining adequate surface cure of the composition. In attempts to overcome the deficiency the emphasis has been on increased source power input per unit length, with resultant increased source intensity and broadened spectral distribution throughout the short-wave ultraviolet and near ultraviolet regions, so that a sufficienly high flux can be delivered to the surface of the exposed composition to overcome oxygen inhibition when curing in air. Indeed, it has been demonstrated that with increased source intensity air cure can be achieved.

Implementing this approach, the trend over the past decade has progressed from the use of nominal 100 watts per inch medium pressure mercury lamps to nominal 200 watts per inch medium pressure mercury lamps, with higher watts per inch lamps continually sought after and under development. It has now been observed that very little of the delivered radiation from such sources is effective for curing the surface and that the total amount of ultraviolet energy required is far in excess of what would be required to adequately cure the coating exclusive of the surface layer. In adition, it is known that as the power input is raised in order to increase the source radiance, the efficiency of generating the ultraviolet radiation energy is decreased.

Figure 2:
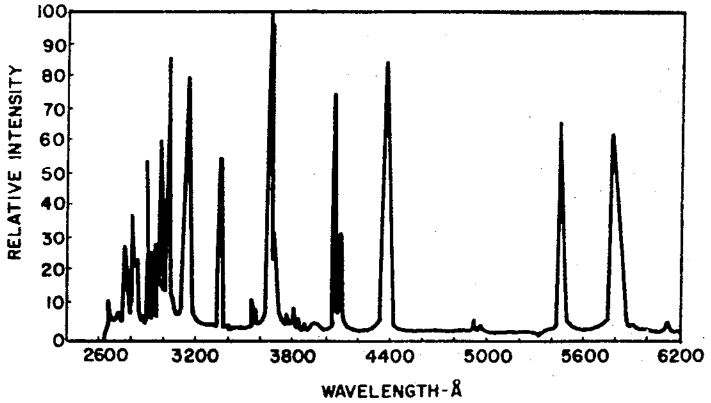

As previously indicated, increased power input has resulted in broadened spectral distribution, such as is illustrated by FIG. 2, which is a typical spectral curve of the ultraviolet and visible radiation from a conventional medium pressure mercury lamp. This broad spectral distribution shows the presence of a widely varying array of ultraviolet and visible radiation having vastly different degrees of penetration and effectiveness for surface cure.

STATEMENT OF THE INVENTION

It was found desirable to utilize short wave ultraviolet radiation that is preferentially absorbed and efficiently used at the surface of the coating. Such short wave ultraviolet radiation is that represented by the 2,537 Angstrom and 1,850 Angstrom resonance lines of mercury. As is known, as the source radiance of mercury lamps is increased, these resonance lines are reversed and contribute little to the total ultraviolet output of medium pressure mercury lamps. An efficient source of this short wave ultraviolet radiation is the low-pressure, low intensity, short wave ultraviolet tube having an electrical input power up to about 5 watts per inch of length. However, when these lamps are used in the presence of air, even though the energy is preferentially absorbed and used at the surface of the coating, the flux level achieved is insufficient to cure the surface due to oxygen inhibition. We have now discovered that by using these low intensity lamps in the presence of an inert atmosphere, one can achieve the desired effects of preferentially and very efficiently and rapidly curing the surface of photocurable coatings. It was completely unexpected and unobvious that such a low flux of short wave ultraviolet radiation would, when the reaction was carried out under an inert atmosphere, polymerize or cure or crosslink certain photocurable compositions at such rapid rates as were observed, since much higher flux mercury lamps presently employed are unable to accomplish the same results in the same period of time.

It has been found that photocurable fluid compositions containing at least one component having a polymerizable ethylenically unsaturated group can be preferentially surface cured or crosslinked by the exposure thereof under an inert gas atmosphere to short wave ultraviolet radiation of critical wavelength herein defined. The particular radiation found useful in carrying out the process of this invention is short wave ultraviolet radiation substantially at a wavelength of 2,537 Angstrom units with some radiation emitting at 1,850 Angstrom units optionally present. It was found that the process of this invention can be carried out in the absence of photosensitizer but that in most instances in the presence of photosensitizer the process is completed in a much shorter period of time. It was further found that desired preferential surface cure is often completed in as little as a fraction of a second. In this application, the term "preferentially surface cured" means that curing initially begins on the surface of the film or coating. The bulk or body of the coating subsequently cures or crosslinks by further treatment.

It has been discovered that short wave ultraviolet light radiation having wavelengths of 2,537 Angstrom units and 1,850 Angstrom units, said values being rounded out to the nearest whole integer, can be used. The critical short wave ultraviolet radiation used in our process is artificially generated and emanates from a mercury tube having an electrical input power up to about 5 watts per inch of length with at least 75 percent of the radiated power having a wavelength of 2,537 Angstrom units. It was a completely unexpected and unobvious finding that these mercury tubes would permit one to carry out the processes of this invention so rapidly since, as previously indicated, the consistent trend has been towards increasing power and intensity in attempts to obtain faster completion of the surface reaction.

For instance, it was observed that low intensity mercury tubes having a total electrical input of 25 watts could be used successfully and efficiently in our process. Among the suitable low intensity mercury lamps are those emitting short wave ultraviolet radiation of 2,537 Angstrom units with at least 75 percent of the ultraviolet light radiated having a wavelength of 2,537 Angstrom units and having a total electrical input of 25 watts. It is to be observed that the 25 watts mercury lamps are only a fraction of the power of the 1,200 watts to 10,000 watts medium pressure mercury lamps that have been generally used commercially in the coatings field. The low intensity, low pressure mercury lamps used in this invention are available commercially; with a 25 watts lamp being, generally, about 36 inches long and having a diameter of about ¾ inch. These 25 watts, low intensity mercury tubes have a power input of about one watt per inch of arc length and about 50 percent of the input power is radiated with 95 percent of the radiated power being short wave ultraviolet at a wavelength of 2,537 Angstrom units.

For comparison, a typical medium pressure mercury lamp having a power input of 100 watts per inch of length radiates 50 percent of the input power with 20 percent of the radiated power being short wave ultraviolet at wavelengths between 1,600 to 3,000 Angstrom units. Another typical medium pressure mercury lamp having a power input of 200 watts per inch of length radiates 50 percent of the input power with only 13 percent of the radiated power being short wave ultraviolet at wavelengths between 1,600 and 3,000 Angstrom units. As the power input per unit length is increased, the percent of short wave ultraviolet generated by the typical medium pressure mercury sources tends to decrease; this is also true as the pressure in the mercury lamp unit is increased because any attempt to increase the power input necessitates increasing the pressure within the unit. It is also known that increasing the power input per unit length of a mercury lamp tends to shorten the life of the lamp.

FIG. 1 is representative of the spectra of the short wave ultraviolet radiation emanating from a low pressure mercury lamp useful in the process of this invention; FIG. 2 is representative of the spectra of a typical medium pressure mercury lamp; and FIG. 3 is representative of the spectra from an argon swirl-flow plasma arc.

FIG. 1 is the spectrum of the short wave ultraviolet radiation that emanates from a 25 watts low pressure mercury lamp. The figure shows a main radiation line at 2,537 Angstrom units and a minor radiation line at 1,850 Angstrom units as the two main radiation lines. These lamps emit essentially all of the ultraviolet light radiation generated at these two wavelengths.

FIG. 2 is the spectrum of the ultraviolet light radiation that emanates from a typical medium pressure mercury lamp. The figure shows a plurality of major peaks in the range below 4,000 Angstrom units and several major peaks above 4,000 Angstrom units in the visible light range with the peaks connected by valley areas. The peaks in the ultraviolet range are not single line radiation as shown in FIG. 1 but have a band-width range that is generally less than 100 Angstrom units; in addition there is some ultraviolet radiation emitted at all wavelengths between the peaks in the valley areas which is not present in the spectrum of the radiation shown in FIG. 1.

Figure 3:
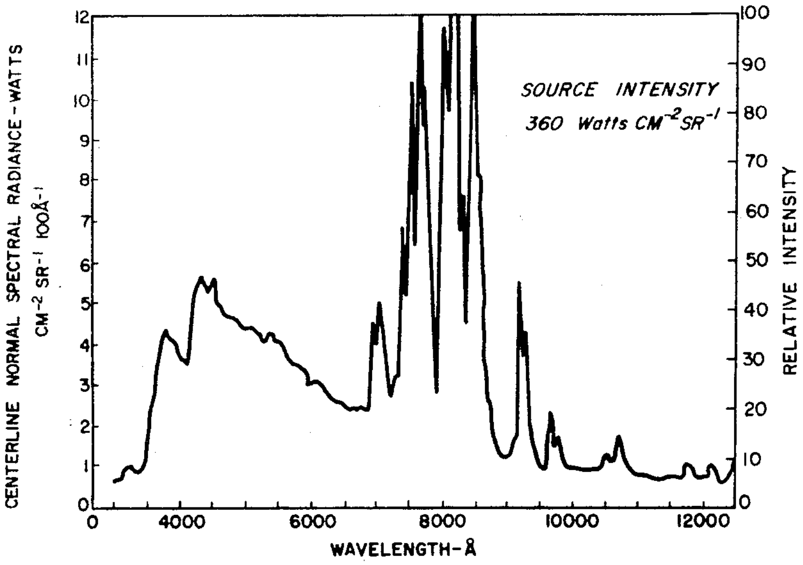

FIG. 3 is the spectrum of the high intensity predominantly continuum light radiation that emanates from an 18 kilowatts argon swirl-flow plasma arc radiation source. The figure shows a continuum of radiation throughout the entire spectrum, including ultraviolet, visible and infrared radiation, and the absence of any peak radiation (such as discussed for FIGS. 1 and 2) in the ultraviolet range below 4,000 Angstrom units.

The figures show the spectra of three sources capable of generating ultraviolet radiation. FIG. 1 is the short wave ultraviolet energy which is utilized in this invention, FIG. 2 is the energy from a typical medium pressure mercury lamp and has been used in essentially all procedures reported since the early discovery that ultraviolet radiation could be used in chemical reactions, and FIG. 3 is the energy from swirl-flow plasma arcs recently discovered as useful in chemical reactions.

The swirl-flow plasma arc, which is a source for generating high intensity predominantly continuum light radiation, is described in U.S. 3,364,387. In this equipment an arc is generated between a pair of electrodes that are axially aligned and encased in a quartz cylinder. A rare gas, such as argon, krypton, neon or xenon, is introduced tangentially through inlets at one end of the cylinder creating a swirling flow or vortex which restricts the arc to a small diameter. An electrical potential applied across the electrodes causes a high density current to flow through the gas and generate a plasma composed of electrons, positively charged ions and neutral atoms. This plasma produces a high intensity predominantly continuum light containing ultraviolet, visible and infrared radiation. The term predominantly continuum light radiation means radiation which has only a minor part of the energy in peaks of bandwidths less than 100 Angstrom units, with a positive amount up to 30 percent of the light radiated having wavelengths shorter than 4,000 Angstrom units and the balance thereof having wavelengths longer than 4,000 Angstrom units.

The low pressure mercury lamps used as a source of the short wave ultraviolet radiation of 2,537 Angstrom units are readily available commercially and were disclosed in United States Letters Patents 2,258,765 2,469,410, and 2,482,507. These lamps vary in power input from 10 watts to 50 watts and are characterized by the fact that they emit short wave ultraviolet radiation essentially all at 2,537 Angstrom units; in this application they are described by the term "low pressure mercury tube" or variants thereof.

In the process of our invention a fluid photocurable composition containing at least one polymerizable monomer, or a mixture thereof with a polymer is exposed under an inert gas atmosphere to the short wave ultraviolet radiation of 2,537 Angstrom units. The composition to be exposed is preferably in the form of a coating. Any known inert gas atmosphere can be used and illustrative thereof are nitrogen, argon, helium, neon, xenon or krypton.

The simplest procedure for carrying out this invention is to expose the photocurable composition to be treated to the short wave ultraviolet radiation of 2,537 Angstrom units from a low pressure mercury tube under an inert gas atmosphere for a period of time sufficient to complete the process. In this procedure preferential surface curing is always attained with such compositions and, where desired, total curing of the coating can also be accomplished by this one form of treatment by continued exposure.

It has been observed that in certain instances, for example, when one is applying a relatively thick coating or when one is employing a relatively slow-curing composition, one may employ a combination of methods to obtain complete cure or crosslinking of the coating in order to achieve the maximum economic benefit of this invention. Each such procedure described requires the exposure of the composition to the short wave ultraviolet radiation of 2,537 Angstrom units from a low pressure mercury tube under an inert gas atmosphere as discussed in the immediately preceding paragraph to obtain the preferential surface cure. Several of these alternative procedures will be described.

A particularly satisfactory procedure involves an initial exposure of the photocurable coating composition to short wave ultraviolet radiation of 2,537 Angstrom units from a low pressure mercury tube under an inert gas atmosphere followed by a subsequent exposure to radiation from medium pressure mercury lamps. It was observed that this procedure results in a preferential surface cure during the initial exposure to the short wave ultraviolet radiation of 2,537 Angstrom units from the low pressure mercury tube with the bulk or volume cure of the coating composition occurring during the subsequent exposure to the radiation from the medium pressure mercury lamps. This procedure is particularly desirable when a relatively thick film is being treated.

It has been further noted that a wrinkle-finish can be produced by proper control of the initial exposure period and the allowance of a time interval before the subsequent exposure.

Another procedure involves an initial exposure in air of the photocurable coating composition to the ultraviolet radiation from medium pressure mercury lamps followed by a subsequent exposure to short wave ultraviolet radiation of 2,537 Angstrom units from a low pressure mercury tube under an inert gas atmosphere. In this procedure the reaction involves primarily bulk or volume cure during the initial exposure followed by preferential surface cure during the subsequent exposure.

Another procedure involves an initial exposure of the photocurable coating composition to short wave ultraviolet radiation of 2,537 Angstrom units from a flow pressure mercury tube under an inert gas atmosphere followed by a subsequent exposure to high intensity predominantly continuum light radiation from a swirl-flow plasma arc radiation source. A wrinkle-finish can be produced if one follows the recommendations outlined previously.

Still another procedure involves an initial exposure in air of the photocurable coating composition to high intensity predominantly continuum light radiation from a swirl-flow plasma arc radiation source followed by a subsequent exposure to short wave ultraviolet radiation of 2,537 Angstrom units from a low pressure mercury tube under an inert gas atmosphere.

A further procedure involves an initial or subsequent exposure of the photocurable coating composition to short wave ultraviolet radiation of 2,537 Angstrom units from a low pressure mercury tube under an inert gas atmosphere combined with exposure to radiation from radioactive materials or from an electron beam such as a Van de Graff accelerator.

The exposure periods for either the initial or subsequent exposure will vary depending upon the particular photocurable coating composition, the presence or absence of photosensitizer and the particular photosensitizer present if one is used, the thickness of the film, and other variables such as the radiation flux delivered to the coating, the final properties desired in the coating, the temperature or other variables in the composition, substrate, surrounding environment or equipment. This is obvious to one skilled in the art and such an individual can readily determine the suitable time period by a preliminary laboratory screening experiment. In all instances, however, it was observed that the total curing time required by the method of our invention was significantly less than the total time that would be required if the coating was not exposed to the short wave ultraviolet radiation of 2,537 Angstrom units from a low pressure mercury tube under an inert gas atmosphere as we have discovered.

The sequence of exposure of the various types of radiation can be varied at the desire of the individual with the above procedures being merely illustrative of the simpler two-step sequences that can be followed. One skilled in the art could, without undue effort, vary the sequence, and it is also apparent that one can carry out the process by the addition of additional exposure steps to the two-step sequences set forth. Thus, one can initially expose the photocurable composition to ultraviolet radiation up to 4,000 Angstrom units from the medium pressure mercury lamps in air, subsequently expose it to ultraviolet radiation of 2,537 Angstrom units from a low pressure mercury tube under an inert gas atmosphere, and then revert back to radiation from the medium pressure mercury lamps or to the high intensity predominantly continuum light radiation from a swirl-flow plasma arc radiation source. The changes in sequence can be readily accomplished by a skilled person and additional sequences can be advantageous when thick films are involved. Of course, one can treat both surfaces of the film or material by having radiation means located both above the upper surface and below the lower surface of the film or material being treated. In those instances wherein the photocurable coating composition is highly inhibited by air or oxygen it is preferred that initial exposure be carried out under an inert gas atmosphere.

The processes of this invention can also be carried out with a heating treatment of the photocurable composition. This is particularly useful when the photocurable compositions being treated contain components which are responsive to heat treatment for curing or crosslinking or further polymerization. When heating is employed any of the conventional means can be used, including ovens, infrared heaters, radiant heaters, microwave, induction, or any suitable heating means, before, during or after irradiation.

While the radiation of the photocurable composition can be carried out at ambient temperature, one can, if one wishes, cool or heat the composition being irradiated during any one or more of the radiation steps employed.

The exposure of the photocurable composition to the short wave ultraviolet radiation of 2,537 Angstrom units from the low pressure mercury tube under an inert gas atmosphere will vary depending upon the particular composition being treated, the distance thereof from the lamp, the temperature and other physical variables. The particular time needed to obtain the desired result in any instance is readily determined by a simple preliminary test whereby a specimen of the photocurable composition is exposed to the radiation for a period of time sufficient to yield the desired polymer properties. When a moving surface is involved, coated with a film having a thickness of less than 0.1 mil to greater than 50 mils, the film can be moved under the low pressure mercury tube under an inert gas atmosphere at rates up to and exceeding 1,200 feet per minute; the higher speeds, of course, being more suitable for the thinner films or coatings or inks or with the more reactive photocurable compositions being treated. The time required is that time sufficient to achieve the desired result and in most instances it is of the order of a fraction of a second with thin films.

The photocurable composition being treated can be at a distance of a fraction of an inch up to several feet from the surface of the low pressure mercury tube. It is desirable to position the tubes and employ reflective surfaces so as to efficiently deliver the flux to the coating surface.

One of the advantages obtained by the use of the low pressure mercury tubes according to this invention is the ability to use the processes of this invention with materials that are heat sensitive or subject to change in moisture content upon prolonged exposure to heated atmospheres, such as paper or cloth. There is essentially no heat evolved from the low pressure mercury tubes, in contrast to large amounts of heat evolved from medium pressure mercury lamps, and there is thus no fear of spontaneous combustion of easily combustible materials or of surface deformation.

The films or coatings can have a thickness varying from less than 0.01 to more than 100 mils. In any particular instance the film thickness will depend upon the ultimate use of the product.

The process of this invention can be used to polymerize or cure or crosslink fluid photocurable composition containing at least one component having a polymerizable ethylenically unsaturated group that is capable of polymerization or curing or crosslinking when exposed to short wave ultraviolet radiation having a wavelength of 2,537 Angstrom units from a low pressure mercury tube under an inert gas atmosphere. The invention is not the particular photocurable composition being treated, it is the discovery of the method of using low intensity short wave ultraviolet radiation of a critical and very limited wavelength to preferentially surface polymerize or cure or crosslink certain photocurable chemical coatings compositions under an inert gas atmosphere and obtain unexpected fast rates of cure, crosslink or polymerization. This discovery of the use of low intensity short wave ultraviolet radiation of limited wavelength to achieve a fast rate of preferential surface cure of a photocurable coating composition under an inert gas atmosphere was a completely unobvious and unexpected finding when one considers that the efforts of those working in this field have been mainly directed towards the goals of finding and developing sources for generating higher intensities and of utilizing as much of the ultraviolet wavelength range emitted as possible to achieve surface cure.

In many instances the photocurable coating compositions can be treated by the process of this invention to produce a solid dry product without the addition of any photosensitizer, activator, catalyst or initiator. This is particularly true of the fast reacting systems, in particular with compositions containing acrylyl compounds having the $CH_2{=}CHCO$— group present. When it is desired to use a photosensitizer, activator, catalyst or initiator, they can be used individually or in combination, with the total amount varying from 0.01 to 20 percent by weight of the photocurable composition. A preferred amount is from 0.1 to 5 percent by weight, with an amount of from 0.5 to 2 percent by weight most preferred. With some combinations one may observe a synergistic effect. These additives and the use thereof are well known in the art and do not require extensive discussions; therefore, only a limited number will be referred to, it being understood that any compound possessing the ability to function in such manner can be used. As suitable photosensitizers one can mention acetophenone, propiophenone, benzophenone, xanthone, thioxanthone, fluorenone benzaldehyde, fluorene, anthraquinone, triphenylamine, carbazole, 2- or 3- or 4-methylacetophenone, 2- or 3- or 4-methoxyacetophenone, 2- or 3- or 4-bromoacetophenone, 3- or 4-allylacetophenone, m- or p-diacetylbenzene, 2- or 3- or 4-methoxybenzophenone, 3,3'- or 3,4'- or 4,4'-dimethoxybenzophenone, 4-chloro-4'-benzylbenzophenone, 2- or 3-chloroxanthone, 3,9-dichloroxanthone, 2- or 3-chlorothioxanthone, 3-chloro-8-nonylxanthone, 3-methoxyxanthone, 3-iodoxanthone, 2-acetyl-4-methylphenyl acetate, benzoin, alkyl, and aryl ethers of benzoin, the phenylglyoxal alkyl acetals, 2,2'-dimethoxy-2-phenylacetophenone, 1,3-diphenyl acetone, naphthalene sulfonyl chloride, toluene sulfonyl chloride. As suitable activators that can be used in conjunction with the photosensitizers one can mention the organic amines such as methylamine, decylamine, diisopropylamine, tributylamine, tri-2-chloroethylamine, ethanolamine, triethanolamine, methyldiethanolamine, 2-aminoethylethanolamine, allylamine, cyclohexylamine, cyclopentadienylamine, diphenylamine, ditolylamine, trixylylamine, tribenzylamine, N - cyclohexylethyleneimine, piperidine, 2-methylpiperidine, N-ethylpiperidine, 1,2,3,4-tetrahydropyridine, 2- or 3- or 4-picoline, morpholine, N-methylmorpholine, piperazine, N-methylpiperazine, 2,2-dimethyl - 1,3 - bis-[3-(N-morpholinyl)propionyloxy]-propane, 1,5 - bis[3 - (N-morpholinyl)propionyloxy]diethyl ether. As suitable catalysts and initiators one can mention the diaryl peroxides, the hydroperoxides, the peracids and peresters, the azo compounds, or any other known free radical initiator or catalyst, such as di-t-butyl peroxide, benzoyl peroxide, 2,4-dichlorobenzoyl peroxide, t-butyl hydroperoxide, peroxyacetic acid, peroxybenzoic acid, t-butyl peroxypivalate, t-butyl peracetate, azobisisobutyronitrile.

Monomers that can be polymerized according to this invention by exposure under an inert gas atmosphere to the short wave ultraviolet radiation having a wavelength of 2,537 Angstrom units include those having at least one polymerizable ethylenically unsaturated group of the structure

Of these monomers the preferred are those containing at least one acrylyl group of the structure $CH_2{=}CHCO$—, illustrative of which one can mention acrylic acid, acrylamide, methyl acrylate, ethyl acrylate, hexyl acrylate, 2-ethylhexyl acrylate, butoxyethoxyethyl acrylate, neopentyl glycol diacrylate, bicyclo[2.2.1]hept-2-yl acrylate, dicyclopentenyl acrylate, pentaerythritol mono- or di- or triacrylate or mixtures thereof, isodecyl acrylate, trimethylolpropane mono- or di- or triacrylate or mixtures thereof, 2-phenoxyethyl acrylate, glycidyl acrylate, 2-ethoxyethyl acrylate, 2-methoxyethyl acrylate, 2-(N,N-diethylamino)ethyl acrylate, omega-methoxyethyl(hendecaoxyethylene) acrylate, omega-tridecoxyethyl(hendecaoxyethylene) acrylate, trimethoxyallyloxymethyl acrylate, bicyclo[2.2.1]hept-2-en-5-ylmethyl acrylate, ethylene glycol diacrylate, bicyclo[2.2.1]hept-2-en-5,6-diyl diacrylate, vinyl acrylate, 2-hydroxypropyl acrylate, 2-hydroxyethyl acrylate, acrylated epoxidized soybean oil, acrylated epoxidized linseed oil, (methyl carbamyl)ethyl acrylate, the reaction product of an aromatic or aliphatic polyisocyanate (such as tolylene diisocyanate) with a hydroxyalkyl acrylate (such as 2-hydroxyethyl acrylate or 2-hydroxypropyl acrylate). The acrylyl compounds are well-known and the above discussion is only illustrative; any photocurable compound containing the acrylyl group is suitable for use.

In addition to the acrylyl monomers one can also mention the methacrylyl monomers such as methacrylic acid, methacrylamide, methyl methacrylate, ethyl methacrylate, cyclohexyl methacrylate, ethylene glycol dimethacrylate, isopropyl methacrylate of any of the methacrylates of the previously identified acrylate compounds; the nitriles such as acrylonitrile and methacrylonitrile; the olefins such as dodecene, styrene, 4-methylstyrene, alpha-methylstyrene, cyclopentadiene, dicyclopentadiene, butadiene, 1,4-hexadiene, 4-methyl-1-pentene, bicyclo[2.2.1]hept-2-ene, bicyclo[2.2.1]hept-2,5-diene, cyclohexene; the vinyl halides such as vinyl chloride, vinylidene chloride; the vinyl esters such as vinyl acetate, vinyl butyrate, vinyl benzoate, vinyl butyral, vinyl methacrylate, vinyl hepto, vinyl crotonate; the vinyl ketones such as vinyl methyl ketone, vinyl phenyl ketone, isopropenyl methyl ketone, divinyl ketone, alpha-chloro-vinyl methyl ketone, vinyl phenyl ketone; acrolein and methacrolein; the vinyl ethers and thioethers such as methyl vinyl ether, ethyl vinyl ether, divinyl ether, isopropyl vinyl ether, the butyl vinyl ethers, 2-ethylhexyl vinyl ether, vinyl 2-chloroethyl ether, vinyl 2-methoxyethyl ether, n-hexadecyl vinyl ether, vinyl methyl sulfide, vinyl ethyl sulfide, divinyl sulfide, 1-chloroethyl vinyl sulfide, vinyl octadecyl sulfide, vinyl 2-ethoxyethyl sulfide, vinyl phenyl sulfide, diallyl sulfide; the miscellaneous sulfur and nitrogen containing monomers such as divinyl sulfone, vinyl ethyl sulfone, vinyl sulfonic acid, vinyl ethyl sulfoxide, sodium vinyl sulfonate, vinyl sulfonamide, vinyl pyridine, N-vinyl pyrollidone, N-vinyl carbazole. Other photocurable monomers are readily apparent to one skilled in the art of polymerization chemistry. The specific compounds mentioned are illustrative only and not all-inclusive. The monomers can be polymerized alone or in mixtures of two or more thereof with the proportions thereof dependent upon the desire of the individual. They can also be blended with polymers and such compositions are then exposed under an inert gas atmosphere to the short wave ultraviolet radiation having a wavelength of 2,537 Angstrom units according to this invention.

The photocurable compositions preferably contain an acrylyl or methacrylyl compound, which can be present at a concentration as low as five percent of the organic compounds in the photocurable coating composition or can constitute all of the reactive organic compounds present in the coating composition. Lesser amounts of acrylyl or methacrylyl compound can be used and in some instances they need not be present, dependent solely upon the desires of the practitioner.

The photocurable compositions that are treated by this invention can contain any of the known pigments, fillers, stabilizers, polymers or other additives conventionally added to coating compositions in the quantities usually employed; provided, however, that they are not employed in such quantities as will unduly interfere or prevent the curing or crosslinking and that the polymers are dissolved or dispersed therein. It is known that some pigments and fillers, for example, can be used in small amounts but that they prevent the reaction from occurring when they are present in large amounts because they absorb the light energy and the ultraviolet light cannot penetrate into the interior of the mixture and cure it completely; therefore, such materials should be used within the quantity ranges that will permit the reaction to proceed properly. In some instances, however, the amount that can be used is less than usual in order that the filler or colorant not unduly interfere with the ability of the ultraviolet radiation to penetrate below the surface of the coating and prevent curing or crosslinking from occurring. These principles are known to those skilled in the art of radiation chemistry and do not require extensive discussion or elaboration, the same is true for the particular materials that can be used. Of course, in some instances, after a surface cure by initial exposure of the coating composition under an inert gas atmosphere to the short wave ultraviolet radiation having a wavelength of 2,537 Angstrom units according to this invention it may be possible to complete the reaction by post-heating as previously discussed. Among the polymers that can be used one can include, for example, the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers.

The term polymer as used herein includes the homopolymers and copolymers and includes the olefin polymers and copolymers such as polyethylene, poly(ethylene/propylene), poly-(ethylene/norbornadiene), poly(ethylene/vinyl acetate), poly(ethylene/vinyl chloride), poly(ethylene/ethyl acrylate), poly(ethylene/acrylonitrile), poly(ethylene/acrylic acid), poly(ethylene/styrene), poly(ethylene/vinyl ethyl ether), poly(ethylene/vinyl methyl ketone), polybutadiene, poly(butadiene/styrene/acrylonitrile), poly(vinylchloride), poly(vinylidene chloride), poly(vinyl acetate), poly(vinyl methyl ether), poly(vinyl methyl ketone), poly(allyl alcohol), poly(vinylpyrrolidone, poly(vinyl butyral), polystyrene, poly(N-vinyl-carbazole), poly(acrylic acid), poly(methyl acrylate), poly(ethyl acrylate), polyacrylonitrile, polyacrylamide, poly-(methacrylic acid), poly(methyl methacrylate), poly(ethyl methacrylate), poly(N,N-dimethyl acrylamide), poly(methacrylamide), polycaprolactone, poly(caprolactone/vinyl chloride), poly(ethylene glycol terephthalate), poly(caprolactam), poly(ethylene oxide), poly(propylene oxide), copolymers of ethylene oxide and propylene oxide with starters containing reactive hydrogen atoms such as the mixed copolymer using ethylene glycol or glycerol or sucrose, etc., as starter, the natural and modified natural polymers such as gutta percha, cellulose, methyl cellulose, starch, silk, wool, and the siloxane polymers and copolymers, the polysulfides and polysulfones, the formaldehyde polymers such as polyformaldehyde, formaldehyde resins such as phenol-formaldehyde, melamine-formaldehyde, urea-formaldehyde, aniline-formaldehyde and acetone-formaldehyde.

Also useful are the low molecular weight urethane oligomers containing free reactive acrylyl or methacrylyl groups such as are disclosed for example, in United States Patent No. 3,509,234 and German Offenlegungsschrift 2103870.0.

The processes of this invention are of particular advantage in the curing or crosslinking of 100 per cent solids photocurable coating compositions. These compositions are well-known and are becoming increasingly important in the coatings field because they are free of conventional volatile solvents which are a potential source of air pollution.

The process of this invention finds use in the treatment of coated or printed surfaces. Thus, it can be used to treat coatings or printed matter on the surface of paper, glass, fabric, metal coil, wood, metal or plastic panels, floor coverings, composition boards, asbestos panels, at such speeds that the coatings are cured to dry films at times as short as a fraction of a minute and that printing inks on newsprint can be treated at press speeds exceeding one thousand feet per minute. The process can be used on fabrics that have been treated with compositions to impart wash and wear properties thereto and affix the composition to the fabric. It can also be used to cure the coating on electrical conductors or magnet wires.

The following examples serve to illustrate the invention.

EXAMPLE 1

Photocurable coatings of various acrylate monomers were applied to 3 by 9 inches steel panels at various film thicknesses. The coated panels were then exposed under nitrogen to short wave ultraviolet radiation of 2,537 Angstrom units from low pressure mercury tubes in a chamber by passing them through the chamber. The overall dimensions of the chamber were 4.5 inches in width by 70 inches in length with the chamber having an inlet tunnel about 20 inches long and 0.5 inches high at one end thereof and an exit tunnel about 10 inches long and 0.5 inches high at the other end thereof. Located between the inlet and exit tunnels was a heightened section about 40 inches long that was 1.5 inches high which was lined with reflective surface. Positioned within this heightened section, at a distance about 1 inch above the base of the chamber and parallel to the length of the chamber, there were four 36 inches long, 25 watts each, low pressure mercury tubes capable of emanating ultraviolet radiation substantially all of which had a wavelength of 2,537 Angstrom units. A sample carrier was used to transport the coated panels through the chamber. During the operation the chamber was continually purged with nitrogen at a flow rate of 800 cc. per minute. Each coated panel was transported through the chamber and exposed under nitrogen to the short wave ultraviolet radiation of 2,537 Angstrom units so as to subject the coating to radiation for the period of time indicated in the table; the properties of the cured coating were then determined. The radiation was carried out at room temperature. The Sward hardness is a measure of surface cure and was determined by the standard procedure using the Gardner Automatic Sward Hardness Tester; the acetone resistance is a measure of the total cure of the coating and was determined by applying a 0.5 inch square cotton cloth pad saturated with acetone on the surface of the cured coating and determining the time in seconds required for the acetone to penetrate through the coating film and lift the coating from the substrate.

| Acrylate monomer | Radiation time, sec. | Wet film thickness, mil. | Remarks | Sward hardness | Acetone resistance, sec. |
|---|---|---|---|---|---|
| Pentaerythritol triacrylate | 3 | 0.3 | Trackfree | | |
| Do | 12 | 0.3 | Hard | 22 | 3 |
| Do | 12 | 2 | do | 8 | 17 |
| Acrylated epoxidized soyabean oil [a] | 12 | 0.3 | Trackfree | | |
| (Methylcarbamyl) ethyl acrylate | 48 | 0.3 | Hard | 10 | 500+ |

[a] Reaction product of 2 moles of acrylic acid with 1 mole of epoxidized soyabean oil having an 8 percent oxirane oxygen content.

EXAMPLE 2

Following the procedure described in Example 1 and using the same equipment a photocurable coating composition was cured at room temperature under a nitrogen atmosphere by exposing it to short wave ultraviolet radiation of 2,537 Angstrom units from low pressure mercury tubes. The coating composition contained 8 grams of the acrylated epoxidized soyabean oil described in Example 1, 5 grams of neopentyl glycol diacrylate and 7 grams of (methylcarbamyl) ethyl acrylate. The coating was applied to steel panels at a wet film thickness of 0.3 ml. Exposure under nitrogen to short wave ultraviolet radiation of 2,537 Angstrom units from the low pressure mercury tubes for 12 seconds produced a preferentially surface cured gelled film; a 24 seconds exposure produced a preferentially surface cured tack-free, gelled film; and a 36 seconds exposure produced a totally cured hard film having a Sward hardness of 32 and an acetone resistance greater than 500 seconds.

EXAMPLE 3

Coating compositions of various monomers with various photosensitizers were produced, applied to steel panels and cured by exposure under nitrogen to short wave ultraviolet radiation of 2,537 Angstrom units from the low pressure mercury tubes using the procedure and apparatus described in Example 1 for the times indicated in the table. The reverse impact was determined by permitting a five pound rod having a rounded trip to drop onto the reverse side of the coated steel panel and recording the distance of drop required to crack the film surface; the value is then reported in inch-pounds. The results are tabulated below:

| Acrylate | Photosensitizer and percent | Wet film thickness mil. | Radiation time, sec. | Sward hardness | Acetone resistance, sec. | Reverse impact, in.-lb. |
|---|---|---|---|---|---|---|
| A | I-3 | 0.3 | 1 | 8 | 500+ | |
| A | I-3 | 0.3 | 3 | 20 | 500+ | |
| A | I-3 | 2 | 1.5 | 8 | 20 | |
| A | II-2 | 2 | 2 | 12 | 400 | |
| A | III-2 | 2 | 12 | 24 | 335 | |
| B | II-2 | 2 | 2 | 24 | 500+ | |
| B | III-2 | 2 | 12 | 46 | 500+ | |
| C | III-2 | 2 | 12 | 24 | 70 | |
| D | III-3 | 2 | 12 | 14 | 10 | |
| E | III-2 | 4 | 12 | 2 | | 150 |
| E | III-2 | 4 | 6 | Tack-free | | 150 |
| E | III-2 | 2 | 12 | 22 | 500+ | |
| E | II-2 | 4 | 12 | 2 | | 150 |
| E | II-2 | 4 | 6 | Tack-free | | 150 |
| E | IV-2 | 4 | 12 | 6 | | 100 |
| E | IV-2 | 4 | 6 | Tack-free | | 150 |
| F | III-2 | 4 | 12 | 2 | | 150 |
| F | III-2 | 4 | 6 | Tack-free | | 150 |
| F | III-2 | 2 | 3 | 2 | 60 | |
| F | III-2 | 2 | 6 | 2 | 350 | |
| G | III-2 | 4 | 12 | Soft film | | 150 |
| H | III-2 | 4 | 72 | do | | 150 |
| J | III-2 | 4 | 72 | do | | 150 |
| K | III-2 | 4 | 24 | Tack-free, wrinkled | | 150 |
| L | III-2 | 4 | 48 | Tack-free, soft film | | 150 |

NOTE.—A=Pentaerythritol triacrylate; B=Neopentyl glycol diacrylate; C=Trimethylolpropane triacrylate; D=Trimethylolpropane trimethacrylate; E=(Methylcarbamyl trimethacrylate; F=2-hydroxyethyl acrylate; G=2-Phenoxyethyl acrylate; H=Isodedecyl acrylate; J=2-ethylhexyl acrylate; K=Dicyclopentenyl acrylate; L=Benzil acylate; I=Diphenyl ketone; II=Benzoin butyl ether; III=Benzoin methyl ether; IV=2,2-diethoxyacetophenone.

An attempt to cure the first coating composition in the above table of Example 3 by exposure of a coated steel panel in air to short wave ultraviolet radiation of 2,537 Angstrom units (using the same equipment but without the nitrogen flow) was unsuccessful. Exposure for 120 seconds in air failed to cure the coating and it remained a wet film. Whereas, as shown in the above table, the same coating was cured to a dry film in 1 second by the process of this invention. Those films indicated as soft films represents the usual property of conventional polymers produced from the monomers employed.

EXAMPLE 4

Coating compositions of various monomers with various photosensitizers were produced, applied to steel panels and cured by an initial exposure under nitrogen to short wave ultraviolet radiation of 2,537 Angstrom units from the low pressure mercury tubes using the procedure and apparatus described in Example 1 followed by a subsequent exposure in air to ultraviolet radiation from two 2.2 kilowatts medium pressure mercury lamps at a distance of ten inches from the lamps. The radiation periods and results are tabulated below:

| Acrylate | Photosensitizer and percent | Wet film thickness, mil | Exposure, sec. Initial | Exposure, sec. Subsequent | Sward hardness | Acetone resistance, sec. | Reverse impact, in.-lb |
|---|---|---|---|---|---|---|---|
| A | III-2 | 2 | 6 | 6 | 18 | 500+ | |
| B | III-2 | 2 | 6 | 6 | 52 | 500+ | |
| B | III-2 | 2 | 3 | 3 | 28 | 500+ | |
| C | III-2 | 2 | 6 | 6 | 38 | 450 | |
| D | III-3 | 2 | 6 | 6 | 20 | 150 | |
| E | III-2 | 2 | 6 | 6 | 22 | 500+ | |
| E | III-2 | 4 | 6 | 6 | 10 | | 50 |
| E | III-2 | 4 | 3 | 3 | 10 | | 125 |
| E | II-2 | 4 | 6 | 6 | 10 | | 75 |
| E | II-2 | 4 | 3 | 3 | 4 | | 125 |
| E | IV-2 | 4 | 6 | 6 | 10 | | 75 |
| E | IV-2 | 4 | 3 | 3 | 4 | | 75 |
| F | III-2 | 4 | 6 | 6 | 4 | | 150 |
| F | III-2 | 4 | 3 | 3 | 2 | | 150 |
| F | III-2 | 2 | 3 | 3 | 2 | 500+ | |

NOTE.—See Example 3 footnotes.

An attempt to cure the first coating composition in the above table of Example 4 by exposure of a coated steel panel in air only to ultraviolet radiation from medium pressure mercury lamps for 120 seconds was unsuccessful; the coating did not cure under these conditions. Similar attempts to cure the second, sixth and thirteenth coating compositions in the above table by exposure in air only to the ultraviolet radiation from medium pressure mercury lamps only were also unsuccessful; the heat generated by these lamps resulted in evaporation or a major amount of the coating and there was still no evidence of cure of the residual wet film on the steel panels even after radiation had proceeded for 120 seconds.

EXAMPLE 5

Coating compositions of various monomers with various photosensitizers were produced, applied to steel panels and cured by an initial exposure for 6 seconds in air to ultraviolet radiation from two 2.2 kilowatts medium pressure mercury lamps at a distance of ten inches from the lamps followed by a subsequent exposure of 6 seconds under nitrogen to short wave ultraviolet radiation of 2,537 Angstrom units from the low pressure mercury tubes using the procedure and apparatus described in Example 1. The radiation periods and results are tabulated below; in each instance 2 percent benzoin methyl ether was used as the photosensitizer.

| | Wet film thickness, mil. | Sward hardness | Acetone resistance, sec. | Reverse impact, in.-lb. |
|---|---|---|---|---|
| Acrylate: | | | | |
| A | 2 | 30 | 500+ | |
| B | 2 | 16 | 150 | |
| C | 2 | 8 | 10 | |
| F | 4 | 8 | | 25 |
| F | 4 | 2 | | 150 |
| K | 4 | 8 | | 25 |

NOTE.—See Example 3 footnotes.

As previously indicated it is advisable to perform a laboratory evaluation to determine the best curing procedure for a particular coating composition. Such an evaluation was made with the coating compositions containing isodecyl acrylate, 2-ethylhexyl acrylate benzil acrylate and 2-phenoxyethyl acrylate and it was found that these coating compositions cured by the procedure of Example 3 but did not cure by the procedure of Example 5 because these monomers are highly air inhibited and the photosensitizer was completely destroyed during the initial exposure in air by the procedure of Example 5 before the coating composition could cure.

EXAMPLE 6

A photocurable coating composition was produced containing 7 grams of (methylcarbamyl)-ethyl acrylate, 3 grams of neopentyl glycol diacrylate and 0.2 gram of benzoin methyl ether. Four mils wet film coverings were applied to steel panels and radiated by the procedures outlined below:

Procedure I—the procedure described in Example 1.
Procedure II—the procedure described in Example 4.
Procedure III—the procedure described in Example 5.
Procedure IV—exposure in air to ultraviolet radiation from two 2.2 kilowatts medium pressure mercury lamps at a distance of 10 inches from the lamps.

The exposure periods and the results are set forth in the following table:

| Procedure | Exposure time, sec. Initial | Exposure time, sec. Subsequent | Sward hardness | Acetone resistance, sec. |
|---|---|---|---|---|
| I | 12 | | 10 | 450 |
| I | 6 | | 8 | 450 |
| II | 3 | 3 | 20 | 500+ |
| II | 6 | 6 | 34 | 500+ |
| II | 1.5 | 1.5 | 8 | 500+ |
| II | 3 | 1.5 | 24 | 500+ |
| III | 6 | 6 | 30 | 500+ |
| III | 3 | 3 | 22 | 500+ |
| III | 1.5 | 1.5 | 18 | 500+ |
| IV (control) | 90 | | (1) | |

(1) Wet film.

EXAMPLE 7

A photocurable coating composition was produced containing 7 grams of (methylcarbamyl)-ethyl acrylate, 3 grams of pentaerythritol triacrylate and 0.2 grams of benzoin methyl ether. Four mils wet film coatings were applied to steel panels and cured by the four procedures set forth in Example 6. The results are shown below; all coatings had an acetone resistance value of more than 500 seconds, except when cured by Procedure D.

| Procedure | Exposure time, sec. Initial | Exposure time, sec. Subsequent | Sward hardness |
|---|---|---|---|
| I | 12 | | 20 |
| II | 6 | | 14 |
| I | 3 | | 8 |
| II | 6 | 6 | 42 |
| II | 1.5 | 1.5 | 32 |
| III | 6 | 3 | 36 |
| III | 3 | 3 | 32 |
| III | 1.5 | 1.5 | 32 |
| IV | 36 | | (1) |

(1) Wet film.

EXAMPLE 8

A coating composition was produced containing 7 grams of 2-phenoxyethyl acrylate, 3 grams of pentaerythritol triacrylate and 0.2 gram of benzoin methyl ether. Four mils wet film coatings were applied to steel panels and cured by the four procedures set forth in Example 6. The results are shown below; all coatings, except the last, had an acetone resistance value of more than 500 seconds. The coatings cured by Procedure III had a hard surface and were wrinkled.

| Procedure | Exposure time, sec. Initial | Subsequent | Sward hardness |
|---|---|---|---|
| I | 12 | | 16 |
| I | 6 | | 8 |
| II | 6 | 6 | 46 |
| II | 3 | 3 | 8 |
| III | 6 | 6 | 6 |
| III | 3 | 3 | 6 |
| IV | 90 | | (1) |

1 Wet film.

EXAMPLE 9

A photocurable coating composition was produced containing 7 grams of (methylcarbamyl)ethyl acrylate, 3 grams of trimethylolpropane triacrylate and 0.2 gram of benzoin methyl ether. Four mils wet film coatings were applied to steel panels and cured by the four procedures set forth in Example 6. The results are shown below; all coatings, except the last, had acetone resistance values of more than 500 seconds.

| Procedure | Exposure time, sec. Initial | Subsequent | Sward hardness |
|---|---|---|---|
| I | 12 | | 16 |
| I | 6 | | 14 |
| I | 3 | | 8 |
| II | 6 | 6 | 38 |
| II | 3 | 3 | 40 |
| II | 1.5 | 1.5 | 34 |
| III | 6 | 6 | 40 |
| III | 3 | 3 | 36 |
| III | 1.5 | 1.5 | 36 |
| IV | 36 | | Tacky |

EXAMPLE 10

A photocurable coating composition was produced containing 7 grams of 2-hydroxyethyl acrylate, 3 grams of trimethylolpropane triacrylate and 0.2 gram of benzoin methyl ether. Four mils wet film coatings were applied to steel panels and cured by the four procedures set forth in Example 6. The results are shown below; all coatings, except the last, had acetone resistance values of more than 500 seconds.

| Procedure | Exposure time, sec. Initial | Subsequent | Sward hardness |
|---|---|---|---|
| I | 12 | | 14 |
| I | 6 | | 6 |
| II | 6 | 6 | 16 |
| III | 6 | 6 | 34 |
| III | 3 | 3 | 16 |
| IV | 90 | | (1) |

1 Wet film.

EXAMPLE 11

A photocurable coating composition was produced containing 13 grams of a polyester (reaction product of one mole phthalic anhydride, one mole of maleic anhydride, 2.1 moles of 1,2-propane diol), 7 grams of styrene and 0.4 gram of benzoin methyl ether. One mil wet film coatings were applied to steel panels and cured by the four procedures set forth in Example 6. The coatings cured by Procedures I and II remained at ambient temperature and loss due to styrene evaporation was retarded because of the preferential surface cure obtained; coatings cured by Procedure III and IV were not preferentially surface cured and showed loss of styrene by evaporation. With this particular coating composition Procedure II would be the preferred curing method. The results are set forth below:

| Procedure | Exposure time, sec. Initial | Subsequent | Sward hardness |
|---|---|---|---|
| I | 36 | | 12 |
| II | 6 | 6 | 66 |
| III | 6 | 6 | 38 |
| IV | 12 | | 62 |

EXAMPLE 12

A photocurable coating composition was produced having the following formulation in parts by weight:

| | |
|---|---|
| Urethane oligomer | 30 |
| Acrylated epoxidized soyabean oil | 20 |
| (Methylcarbamyl)ethyl acrylate | 35 |
| Neopentyl glycol diacrylate | 15 |
| Titanium dioxide | 50 |
| Calcium carbonate | 30 |
| 2-chlorothioxanthone | 2 |
| Methyldiethanolamine | 3 |

The urethane oligomer was the reaction product, at about 40° to 50° C., of one mole of poly(epsilon-caprolactone) having an average molecular weight of about 550 (which was produced by reacting epsilon-caprolactone using trimethylol propane as the starter), 3 moles of isophorone diisocyanate and 3 moles of 2-hydroxyethyl acrylate. The acrylated epoxidized soyabean oil had an average of 2.2 acrylyl groups. Four mils wet film coatings were applied to steel panels and cured by the four procedures set forth in Example 6. The results are shown below:

| Procedure: | Exposure time, sec. Initial | Subsequent | Sward hardness | Acetone resistance, sec. |
|---|---|---|---|---|
| I | 7 | | 4 | 12 |
| I | 3.5 | | 4 | 6 |
| II | 1.8 | 1.8 | 6 | 20 |
| II | 6 | 6 | 8 | 70 |
| III | 1.8 | 1.8 | 6 | 45 |
| III | 6 | 6 | 10 | 170 |
| IV | 5.5 | | (1) | |

1 Tacky surface.

EXAMPLE 13

A photocurable coating composition was produced having the following formulation in parts by weight:

| | |
|---|---|
| Urethane adduct | 30 |
| Acrylated epoxidized soyabean oil | 20 |
| (Methylcarbamyl)ethyl acrylate | 40 |
| Neopentyl glycol diacrylate | 10 |
| Titanium dioxide | 50 |
| Calcium carbonate | 30 |
| 2-chlorothioxanthone | 2 |
| Methyldiethanolamine | 3 |

The urethane adduct was prepared by reacting at 40° to 45° C. one mole of trimethylhexamethylene diisocyanate dissolved in 0.1 mole of 2-phenoxyethyl acrylate with two moles of 2-hydroxyethyl acrylate. One mil wet film coatings were applied to steel panels and cured by the four procedures set forth in Example 6. The results are shown below:

| | Exposure time, sec. Initial | Exposure time, sec. Subsequent | Sward hardness | Acetone resistance, sec. |
|---|---|---|---|---|
| Procedure: | | | | |
| I | 3.5 | | 2 | 5 |
| I | 7 | | 8 | 10 |
| II | 1.8 | 1.8 | 16 | 180 |
| III | 1.8 | 1.8 | 12 | 60 |
| III | 6 | 6 | 20 | 600+ |
| IV | 5.5 | | (1) | |

[1] Tacky surface.

EXAMPLE 14

A photocurable coating composition was produced having the following formulation in parts by weight:

| | |
|---|---|
| Urethane adduct (see Ex. 13) | 50 |
| Neopentyl glycol diacrylate | 15 |
| (Methylcarbamyl)ethyl acrylate | 35 |
| Titanium dioxide | 40 |
| Calcium carbonate | 40 |
| 2-chlorothioxanthone | 1.5 |
| Methyldiethanolamine | 3 |

One mil wet film coatings were applied to steel panels and cured by the four procedures set forth in Example 6. The results are shown below:

| | Exposure time, sec. Initial | Exposure time, sec. Subsequent | Sward hardness | Acetone resistance, sec. |
|---|---|---|---|---|
| Procedure: | | | | |
| I | 3.5 | | 12 | 7 |
| I | 7 | | 10 | 100 |
| II | 1.8 | 1.8 | 12 | 325 |
| II | 6 | 6 | 24 | 600+ |
| III | 1.8 | 1.8 | 16 | 600+ |
| III | 6 | 6 | 26 | 600+ |
| IV | 5.5 | | (1) | |

[1] Tacky surface.

EXAMPLE 15

A photocurable coating composition was produced having the following formulation in parts by weight:

| | |
|---|---|
| Urethane oligomer | 42 |
| (Methylcarbamyl)ethyl acrylate | 15 |
| Isodecyl acrylate | 6 |
| Neopentyl glycol diacrylate | 23 |
| 2-hydroxyethyl acrylate | 6 |
| Benzoin butyl ether | 2 |
| Silica | 6 |

The urethane oligomer was the reaction product, at about 40° to 50° C., of one mole of poly(epsilon-caprolactone) having an average molecular weight of about 550 (which was produced by reacting epsilon-caprolactone using trimethylol propane as the starter), 3 moles of bis (4-isocyanatocyclohexyl)methane and 3 moles of 2-hydroxyethyl acrylate. Four mils wet film coatings were applied to steel panels and cured by the four procedures set forth in Example 6. The results are shown below:

| | Exposure time, sec. Initial | Exposure time, sec. Subsequent | Sward hardness | Acetone resistance, sec. |
|---|---|---|---|---|
| Procedure: | | | | |
| I | 6 | | 16 | 400 |
| I | 3 | | 6 | 200 |
| II | 3 | 1.5 | 42 | 600+ |
| II | 6 | 1.5 | 42 | 600+ |
| II | 1.5 | 1.5 | | 600+ |
| III | 1.5 | 0.9 | 28 | 600+ |
| III | 1.5 | 1.5 | 34 | 600+ |
| IV | 7 | | (1) | |

[1] Tacky, not cured.

EXAMPLE 16

A photocurable coating composition was produced having the following formulation in parts by weight:

| | |
|---|---|
| Urethane oligomer (see Ex. 12) | 40 |
| (Methylcarbamyl)ethyl acrylate | 35 |
| Neopentyl glycol diacrylate | 25 |
| Benzoin methyl ether | 2 |

Two mils wet film coatings were applied to steel panels and cured by the four procedures set forth in Example 6 and by the additional two procedures outlined below:

Procedure V—initial exposure in air to the predominantly continuum light radiation from a 12 kilowatt argon swirl-flow plasma arc at a distance of 6 inches, followed by a subsequent exposure under nitrogen to short wave ultraviolet radiation of 2,537 Angstrom units as described in Example 1.

Procedure VI—initial exposure under nitrogen to short wave ultraviolet radiation of 2,537 Angstrom units as described in Example 1, followed by a subsequent exposure in air to the predominantly continuum light radiation from a 12 kilowatt argon swirl flow plasma arc at a distance of 6 inches.

In all instances, except when Procedure IV was used, the coatings had an acetone resistance value of more than 500 seconds; the results are shown below;

| | Exposure time, sec. Initial | Exposure time, sec. Subsequent | Sward hardness | Reverse impact, in.-lb. |
|---|---|---|---|---|
| Procedure: | | | | |
| I | 6 | | 44 | 50 |
| I | 3 | | 28 | 150 |
| II | 3 | 3 | 46 | 25 |
| III | 3 | 3 | 38 | <25 |
| III | 1.5 | 1.5 | 26 | 75 |
| IV | 36 | | (1) | |
| V | 1 | 3 | 40 | 25 |
| VI | 3 | 1 | 54 | 75 |

[1] Wet surface.

EXAMPLE 17

A photocurable coating composition was produced having the following formulation in parts by weight:

| | |
|---|---|
| Urethane oligomer (see Ex. 12) | 40 |
| Dicyclopentenyl acrylate | 35 |
| Neopentyl glycol diacrylate | 25 |
| Benzoin methyl ether | 2 |

Wet film coatings two mils thick were applied to steel panels and cured by the six procedures used in Example 16. The results are shown below:

| Procedure | Exposure time, sec. Initial | Exposure time, sec. Subsequent | Sward hardness | Reverse impact, in.-lb. | Acetone resistance, sec. |
|---|---|---|---|---|---|
| I | 6 | | 12 | 125 | 110 |
| I | 3 | | 10 | 125 | 50 |
| II | 3 | 3 | 60 | 25 | 500+ |
| III | 3 | 3 | 34 | 150 | 500+ |
| III | 1.5 | 1.5 | 22 | 50 | 500+ |
| V | 1 | 3 | 30 | 25 | 310 |
| VI | 3 | 1 | 42 | <25 | 450 |
| IV | 18 | | (1) | | |

[1] Wet surface, not cured.

EXAMPLE 18

A photocurable coating composition was produced having the following formulation in parts by weight:

| | |
|---|---|
| Urethane oligomer (see Ex. 12) | 40 |
| 2-phenoxyethyl acrylate | 40 |
| Pentaerythritol triacrylate | 20 |
| Benzoin methyl acrylate | 2 |

Wet film coatings two mils thick were applied to steel panels and cured by the six procedures used in Example 16. The results are shown below:

| Procedure | Exposure time, sec. Initial | Subsequent | Sward hardness | Reverse impact, in.-lb. | Acetone resistance, sec. |
|---|---|---|---|---|---|
| I | 6 | ---------- | 14 | 150 | 135 |
| I | 3 | ---------- | 12 | 150 | 65 |
| II | 3 | 3 | 46 | 25 | 500+ |
| III | 3 | 3 | 42 | 125 | 500+ |
| III | 1.5 | 1.5 | 34 | 150 | 500+ |
| V | 1 | 3 | 44 | 50 | 500+ |
| VI | 3 | 1 | 56 | <25 | 500+ |
| IV | 36 | ---------- | (1) | ---------- | ---------- |

[1] Wet surface, not cured.

EXAMPLE 19

A photocurable coating composition was produced having the following formulation in parts by weight:

| | |
|---|---|
| Urethane oligomer | 24 |
| 2-hydroxyethyl acrylate | 16 |
| (Methylcarbamyl)ethyl acrylate | 60 |
| Benzoin methyl ether | 2 |

The urethane oligomer was the reaction product of one mole of poly(epsilon-caprolactone) having an average molecular weight of about 530 (which was produced by reacting epsilon-caprolactone using diethylene glycol as the starter), 2 moles of tolylene disiocyanate and 2 moles of 2-hydroxyethyl acrylate. Two mils wet film coatings were applied to steel panels and cured by the six procedures used in Example 16. The results are shown below; all coatings had a reverse impact of 150 inch-pounds.

| Procedure | Exposure time, sec. Initial | Subsequent | Sward hardness | Acetone resistance, sec. |
|---|---|---|---|---|
| I | 6 | ---------- | 4 | 500+ |
| I | 3 | ---------- | 4 | 500+ |
| II | 3 | 3 | 4 | 500+ |
| III | 3 | 3 | 4 | 500+ |
| III | 1.5 | 1.5 | 2 | 500+ |
| V | 1 | 3 | 2 | 500+ |
| VI | 3 | 1 | 2 | 235 |
| IV | 36 | ---------- | (1) | -------- |

[1] Wet surface, not cured.

EXAMPLE 20

A photocurable coating composition was produced having the following formulation in parts by weight. This composition contains hexamethoxymethylmelamine, which is responsive to heat curing.

| | |
|---|---|
| (Methylcarbamyl)ethyl acrylate | 55 |
| Neopentyl glycol diacrylate | 25 |
| Hexamethoxymethylmelamine | 20 |
| p-Toluene sulfonic acid (10% in $CH_3OH$) | 1 |
| Benzoin methyl ether | 2 |

Wet film coatings were applied to steel panels and cured by initial exposure under nitrogen to short wave ultraviolet radiation of 2,537 Angstrom units as described in Example 1 followed by post heating in a forced air oven for 20 minutes at 82° C. The initial radiation exposure resulted in a tack-free gelled coating that showed preferential surface cure; total cure of the coating was obtained after the post heating step. Attempts to reverse the curing procedure by initially preheating the coating followed by subsequent exposure under nitrogen to short wave ultraviolet radiation of 2,537 Angstrom units from the same low pressure mercury tubes failed to give a satisfactory finished coating; it was observed that the acrylate monomers evaporated during the preheat step.

The properties of the coatings produced by the first-described sequence were as follows:

| Film thickness | Exposure time, sec. | Sward hardness | Reverse impact, in.-lb. | Acetone resistance, sec. |
|---|---|---|---|---|
| 4 | 6 | 12 | <25 | 490 |
| 4 | 3 | 4 | <25 | 315 |
| 2 | 6 | 14 | 25 | 130 |
| 2 | 3 | 14 | 25 | 125 |
| 2 | 1.5 | 4 | 25 | 60 |

We claim:

1. A process for preferentially and rapidly polymerizing or curing or crosslinking the exterior surface of a film layer on a moving substrate of a photocurable monomer or polymer composition containing at least one polymerizable acrylyl or methacrylyl group which comprises exposing said photocurable composition under an inert gas atmosphere to a low pressure mercury short wave ultraviolet radiation source, at least 75% of the radiated power being at a wavelength of 2,537 Angstrom units whereby the exterior surface of the film is preferentially polymerized or cured or crosslinked.

2. A process as claimed in claim 1 wherein said short wave ultraviolet radiation of 2,537 Angstrom units emanates from a low pressure mercury tube having an electrical input up to about 5 watts per inch of length.

3. A process as claimed in claim 1 wherein the exposure to said short wave ultraviolet radiation of 2,537 Angstrom units is under nitrogen.

4. A process as claimed in claim 1 wherein said photocurable monomer or polymer composition is in the form of a coating film on a substrate.

5. A process as claimed in claim 2 wherein said photocurable monomer or polymer composition is in the form of a coating film on a substrate.

6. A process as claimed in claim 3 wherein said photocurable monomer or polymer composition is in the form of a coating film on a substrate.

7. A process as claimed in claim 1 wherein said photocurable monomer or polymer composition contains at least one methacrylyl group.

8. A process as claimed in claim 2 wherein said photocurable monomer or polymer composition contains at least one methacrylyl group.

9. A process as claimed in claim 3 wherein said photocurable monomer or polymer composition contains at least one methacrylyl group.

10. A process as claimed in claim 1 wherein said photocurable monomer or polymer composition contains at least one acrylyl group.

11. A process as claimed in claim 2 wherein said photocurable monomer or polymer composition contains at least one acrylyl group.

12. A process as claimed in claim 3 wherein said photocurable monomer or polymer composition contains at least one acrylyl group.

13. A process as claimed in claim 1 wherein the initial exposure of said photocurable monomer or polymer composition is to ultraviolet radiation from medium pressure mercury lamps followed by subsequent exposure to said short wave ultraviolet radiation of 2,537 Angstrom units under an inert gas atmosphere.

14. A process as claimed in claim 1 wherein said photocurable monomer or polymer composition is preheated before exposure to said short wave ultraviolet radiation of 2,537 Angstrom units.

15. A process as claimed in claim 1 wherein said photocurable monomer or polymer composition is postheated after exposure to said short wave ultraviolet radiation of 2,537 Angstrom units.

16. A process as claimed in claim 1 wherein the initial exposure of said photocurable monomer or polymer coating composition is to said short wave ultraviolet radiation of 2,537 Angstrom units under an inert gas atmosphere followed by subsequent exposure to ultraviolet radiation from medium pressure mercury lamps.

References Cited

UNITED STATES PATENTS

| | | | |
|---|---|---|---|
| 3,714,006 | 1/1973 | Anderson -------- | 204—159.14 |
| 2,505,067 | 4/1950 | Sachs et al.------ | 204—159.23 |
| 2,460,105 | 1/1949 | Richards --------- | 204—159.24 |
| 3,622,482 | 11/1971 | Trecker et al. ---- | 204—159.23 |
| 3,650,927 | 3/1972 | Levinos ---------- | 204—159.23 |
| 3,552,896 | 1/1971 | Bassemir et al. --- | 204—159.23 |
| 3,615,455 | 10/1971 | Lartdon et al. ---- | 204—159.23 |
| 3,615,454 | 10/1971 | Cescon et al. ---- | 204—159.23 |

MURRAY TILLMAN, Primary Examiner

R. B. TURER, Assistant Examiner

U.S. Cl. X.R.

117—93.31, 132 R, 132 BE; 204—159.11, 159.14, 159.15, 159.16, 159.17. 159.18, 159.19, 159.2, 159.22, 159.23, 159.24, 160.1; 260—23 EP, 23 TN, 47 UA, 41 B, 77.5 BB, 89.5 A, 89.5 R, 856, 859, 861